(12) United States Patent
Drahota

(10) Patent No.: US 8,310,096 B1
(45) Date of Patent: Nov. 13, 2012

(54) ELECTRICAL BACKUP FOR A GAS FURNACE

(76) Inventor: Jordan A. Drahota, Champaign, IL (US)

( * ) Notice: Subject to any disclaimer, the term of this patent is extended or adjusted under 35 U.S.C. 154(b) by 295 days.

(21) Appl. No.: 12/686,140

(22) Filed: Jan. 12, 2010

Related U.S. Application Data

(60) Provisional application No. 61/204,708, filed on Jan. 12, 2009.

(51) Int. Cl.
*H02J 7/00* (2006.01)
*H02J 9/00* (2006.01)

(52) U.S. Cl. .......................................... 307/66

(58) Field of Classification Search ............... 307/65, 307/66, 64; 126/110 R; 320/101
See application file for complete search history.

(56) References Cited

U.S. PATENT DOCUMENTS

| | | | |
|---|---|---|---|
| 5,118,301 A | 6/1992 | Bentivolio | |
| 5,427,086 A * | 6/1995 | Brownell | 126/110 R |
| 5,804,889 A | 9/1998 | Hu et al. | |
| 6,169,340 B1 | 1/2001 | Jones | |
| 6,645,652 B2 | 11/2003 | Cownden et al. | |
| 6,973,789 B2 | 12/2005 | Sugarmen et al. | |
| 7,301,468 B2 | 11/2007 | Pai | |

\* cited by examiner

*Primary Examiner* — Carlos Amaya
(74) *Attorney, Agent, or Firm* — Montgomery Patent & Design, LLC; Robert C. Montgomery; Joseph T. Yaksich

(57) ABSTRACT

An apparatus that provides backup electrical power for a forced air furnace system is herein disclosed, comprising a set of thermal chips which produce electric power directly from the burner area. This electric power is then used to charge a deep cell battery which is then used to power the control circuitry of the furnace as well as the fan motor in the event of a power failure. A relay to switch between battery operation and conventional AC power is provided on the incoming AC power line. Such changeover between AC operation and battery operation is fully automatic and requires no user action. When commercial AC power returns the apparatus switches back to conventional power distribution. Due to the electric producing power capability of the thermal chips it is envisioned that the apparatus could operate continuously for days on end without the use of AC power. It is envisioned that the present apparatus would be made available as standard or optional equipment on new furnaces or could be provided as an add-on kit for aftermarket installation on existing furnaces.

12 Claims, 2 Drawing Sheets

ELECTRICAL BACKUP FOR A GAS FURNACE

RELATED APPLICATIONS

The present invention was first described in and claims the benefit of U.S. Provisional Patent No. 61/204,708 filed Jan. 12, 2009, the entire disclosures of which are incorporated herein by reference.

FIELD OF THE INVENTION

The present invention relates generally to an electrical backup apparatus and, more specifically, to said apparatus comprising a plurality of thermal power chips, a controlling means, and a method of installation.

BACKGROUND OF THE INVENTION

Electricity comprises perhaps the most important utility in the modern day. Most modern accommodations and devices require access to the power grid in order to function. Even systems such as gas furnaces require electricity to power the electrical control systems which run the system from settings on the thermostat, internal sensors, and the like. While common household electricity is general in constant and stable supply, it is not uncommon for adverse weather conditions and other similar events to cause temporary power outages.

As stated above, electricity is fundamental to the functioning of many basic systems. Some systems such as gas furnaces may even been considered basic survival necessities, particularly in times of extremely cold weather during which power outages are actually more likely to occur. While backup battery supplies and generators are not uncommon, these systems do not provide a continuous power supply during such an outage, which can be problematic for systems such as gas furnaces. Furthermore, these types of systems can be difficult, frustrating, or even impossible for an average user to hook up to an existing hardwired system such as a gas furnace.

Various attempts have been made to provide apparatuses which provide continuous power to electrical appliances. Examples of these attempts can be seen by reference to several U.S. patents. U.S. Pat. No. 5,804,889, issued in the name of Hu et al., describes an uninterruptible power supply apparatus for a diffusion furnace. The Hu apparatus provides circuitry with a switch designed to prevent interruption to the power supply of a diffusion furnace.

U.S. Pat. No. 6,169,340, issued in the name of Jones, describes an electrical junction box for auxiliary power. The Jones apparatus provides a method for the quick and easy connection of an auxiliary power source such as a generator to a single hard wired appliance.

While these apparatuses fulfill their respective, particular objectives, each of these references suffer from one (1) or more of the aforementioned disadvantages. Many such apparatuses are not particularly suited to the design of gas furnaces. Also, many such apparatuses do not provide an automatic means for providing continuous, uninterrupted power during a switchover from in-wall power to the backup power supply. Furthermore, many such devices do not provide a means for the continuous operation of a gas furnace's controls from the provided backup power supply during periods of extended power outage. Accordingly, there exists a need for an electrical backup for gas furnaces without the disadvantages as described above. The development of the present invention substantially departs from the conventional solutions and in doing so fulfills this need.

SUMMARY OF THE INVENTION

In view of the foregoing references, the inventor recognized the aforementioned inherent problems and observed that there is a need for a means to provide an electrical backup for gas furnaces which provides a means for an automatic, uninterrupted supply of power during the activation of the backup power system and a means for the sustained operation of the furnace's controls during periods of extended power outage. Thus, the object of the present invention is to solve the aforementioned disadvantages and provide for this need.

To achieve the above objectives, it is an object of the present invention to comprise an apparatus which provides backup electrical power to a gas furnace such as a gas-fired forced air furnace or the like. The apparatus comprises a plurality of thermal chips which produce electric power directly from the heat created from the burner area of the furnace in order to allow the apparatus to operate continuously without the use of AC power.

Another object of the present invention is to rout electrical power through a disconnect switch to a transfer relay. The transfer relay is used to automatically switch connections between the external electrical power through the disconnect switch and internal power generated by the apparatus.

Yet still another object of the present invention is to comprise a thermostat of the standard type and design. The thermostat controls operation of the gas furnace in a conventional manner, which in turn controls operation of the apparatus.

Yet still another object of the present invention is to comprise a plurality of thermal power chips placed at the heat exchanger of the furnace. The thermal power chips comprise thermionic emission type semiconductors which convert heat energy from the heat exchanger into electrical energy without intermediate steps or moving parts.

Yet still another object of the present invention is to rout the direct voltage produced by the thermal power chips to a voltage regulator which conditions and levels the output of the chips. The power from the regulator is then routed to a charge controller which is used to charge a rechargeable battery. The rechargeable battery is utilized in lieu of the thermal power chips during startup conditions.

Yet still another object of the present invention is to locate the battery in an elevated position in the gas furnace in order to protect from physical dangers such as floods and the like. The output of the rechargeable battery is routed through an inverter which operates in a conventional manner to produce 120 VAC from the direct voltage input. The output is applied to the opposite side of the transfer relay to operate the gas furnace in the event of a long term power failure.

Yet still another object of the present invention is to comprise a controller, which comprises a common controller such as a basic stamp module, a microcontroller, or the like. The controller operates and controls all electrical devices to ensure proper crossover between operation on conventional AC power and the apparatus. The controller switches the supply back to conventional AC power whenever it is available for more efficient operation.

Yet still another object of the present invention is for the inverter to produce AC power with input from the DC power bus in order to feed to common gas furnace systems such as burner safety systems, gas control valves, step down transformers, interlock systems, inducer motors, and the like. Control of the relay coil of the transfer relay is controlled by the controller.

Yet still another object of the present invention is to be adaptable as either standard or optional equipment on new gas furnaces. It is also envisioned that the apparatus could be provided as a retrofittable kit for existing gas furnaces.

Yet still another object of the present invention is to provide a method of utilizing the device that provides a unique means of instantaneously and unnoticeably activating the rechargeable battery in the event of loss of commercial AC power, providing continuous operation from the recharging capabilities of the thermal power chips array, and automatically reengaging the use of commercial AC power as soon as it is restored.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

| | |
|---|---|
| 10 | electrical-powered back-up apparatus for gas-fired furnaces |
| 15 | gas-fired forced air furnace |
| 20 | gas line |
| 25 | central burner area |
| 30 | pre-conditioned air |
| 35 | intake air |
| 40 | variable speed blower |
| 45 | heat exchanger |
| 50 | output air |
| 55 | heated ambient air |
| 60 | flue gas stack |
| 62 | inducer motor |
| 65 | disconnect switch |
| 70 | transfer relay |
| 73 | thermostat |
| 75 | thermal power chip |
| 80 | voltage regulator |
| 85 | charge controller |
| 90 | rechargeable battery |
| 95 | inverter |
| 100 | variable speed drive DC converter |
| 105 | controller |
| 110 | thermal power chip array |
| 115 | commercial AC power source |
| 120 | AC power load |

DETAILED DESCRIPTION OF THE PREFERRED EMBODIMENT

Figure 1:
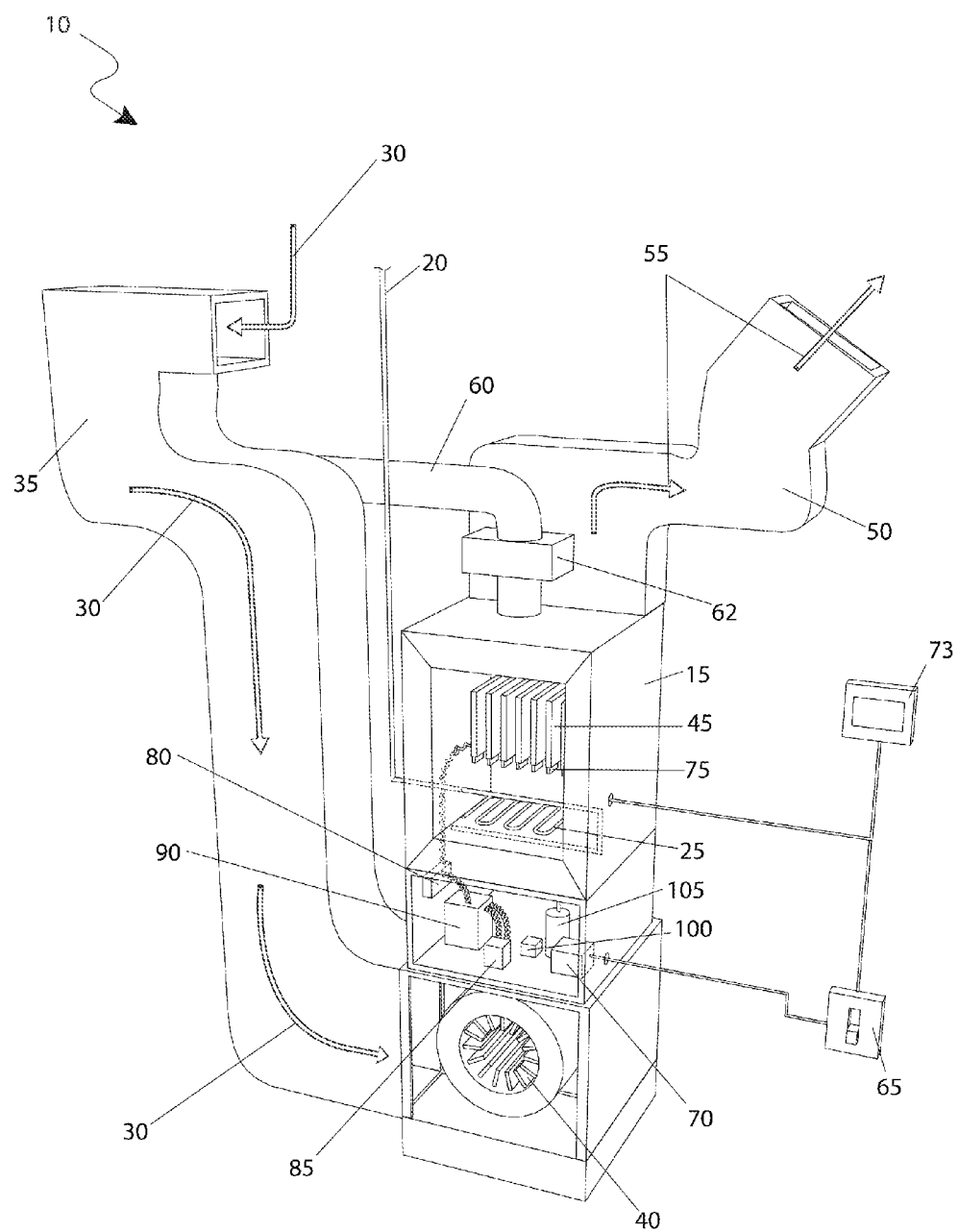
FIG. 1 is an isometric diagram of the electrical powered back-up apparatus for gas fired furnaces 10 as used on a gas fired forced air furnace 15, according to the preferred embodiment of the present invention; and, FIG. 2 is an electrical block diagram depicting the major components of the electrical powered back-up apparatus for gas fired furnaces 10 according to the preferred embodiment of the present invention.
Figure 2:
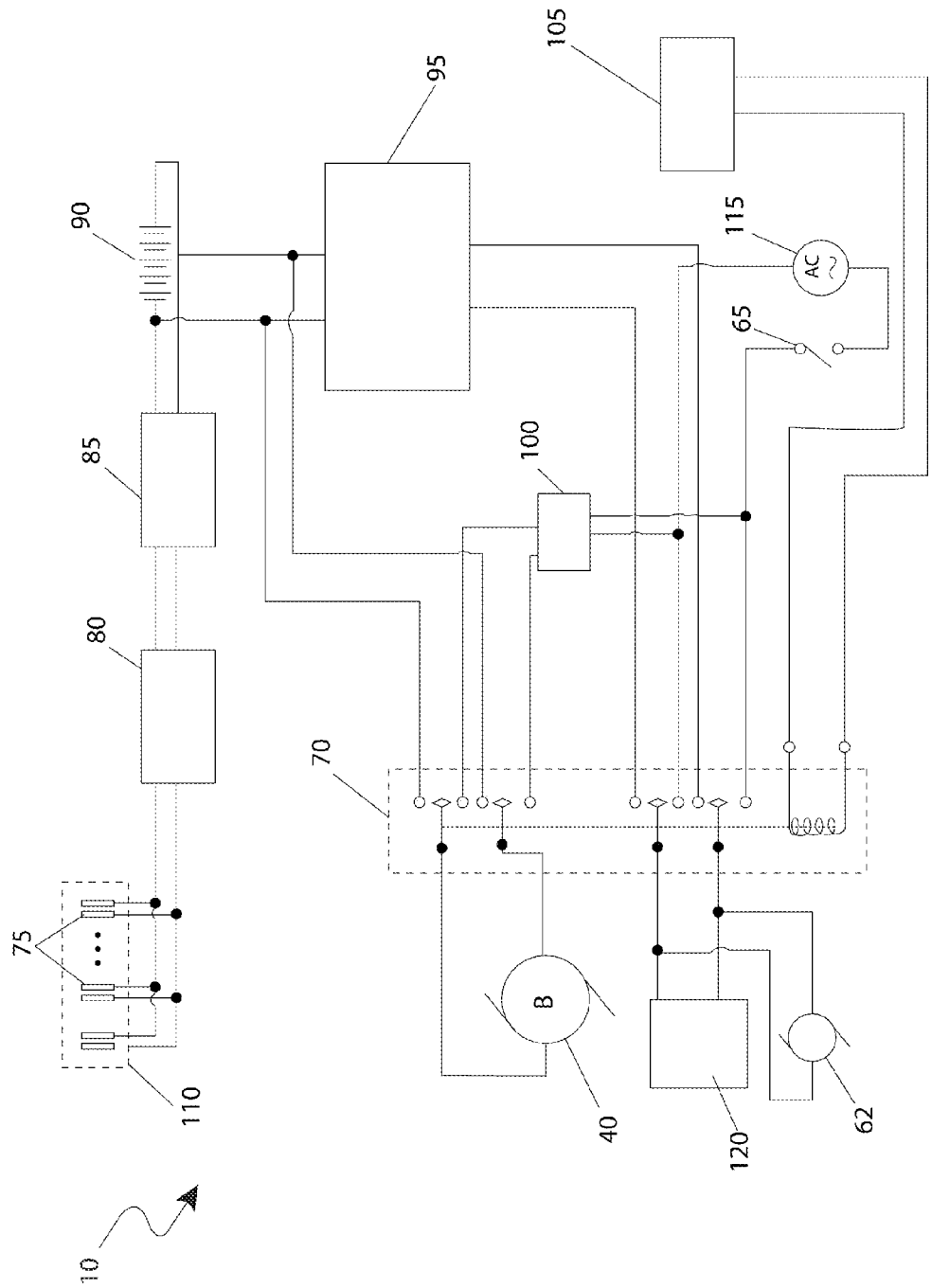

The best mode for carrying out the invention is presented in terms of its preferred embodiment, herein depicted within FIGS. 1 and 2. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes an electrical backup for gas furnaces (herein described as the "apparatus") 10, which provides a means for providing backup electrical power to a gas-fired forced air furnace 15 comprising a plurality of thermal chips 75 which produce electric power directly from the heat created from burner area. Due to the electric producing power capability of the apparatus 10, it is envisioned that said apparatus 10 could operate continuously for days on end without the use of AC power.

Referring now to FIG. 1, an isometric diagram of the apparatus 10 as, according to the preferred embodiment of the present invention, is disclosed. The gas-fired forced air furnace 15 is of a standard forced air variety although the teachings of the present apparatus 10 can be readily adapted to other styles of central heating systems in a similar manner by those familiar in the art. The gas-fired forced air furnace 15 is supplied a source of fuel by a gas line 20 to a central burner area 25. A source of pre-conditioned air 30 is provided through intake air 35. The pre-conditioned air 30 is then routed through a variable speed blower 40. The output of the variable speed blower 40 results in pressurized air that is routed through a heat exchanger 45. This action results in the air being heated to an acceptable level and then being routed through an output air 50 as heated ambient air 55. The heated ambient air 55 is then distributed through conventional ductwork to heat a residential building, a commercial building, or industrial building. Waste combustion air is routed through a flue gas stack 60. An inducer motor 62 is located within the flue gas stack 60 in order to facilitate more effective burning of fuel. Said functionality afforded by the inducer motor 62 is well known in the art and not within the scope of the present invention. Additionally, said features are not a requirement of the present invention and thus should not be interpreted as a limiting factor of the present invention. Electrical power is routed through a disconnect switch 65 to a transfer relay 70. The transfer relay 70 is used to control whether the external electrical power through the disconnect switch 65 is used, or internal power that is generated by the electrical-powered back-up apparatus for gas-fired furnaces 10. Further disclosure on the production of internal power will be described below. Operation of the electrical-powered back-up apparatus for gas-fired furnaces 10 as well as the gas-fired forced air furnace 15 will be governed by a thermostat 73 of the standard type and design.

The electrical power generation capabilities of the apparatus 10 is initiated by a plurality of thermal power chip 75 placed at the heat exchanger 45. The thermal power chips 75 are of the thermionic emission type of semiconductor which allows it to convert one (1) form of energy to another without intermediate steps or moving parts. Said thermal power chips 75 have the added advantage of working efficiently using any fuel source. The thermal power chips 75 operate by using thermionic energy conversion whereby the thermal energy of a hot surface or area overcomes the electrostatic forces holding electrons to its surface. These free, excited electrons are then intercepted by a cold surface or area thus generating a direct electrical current. Said thermal power chip 75 is known in the art and produced by various firms such as Power Chips PLC. The direct voltage as produced by a plurality of thermal power chips 75 is then directed to a voltage regulator 80 to condition and level the output of said thermal power chips 75 based upon different heat differentials. Power is then routed to a charge controller 85 which is used to charge a rechargeable battery 90. The rechargeable battery 90 is utilized in lieu of the thermal power chips 75 during startup conditions. The rechargeable battery 90 is located in an elevated position in the gas-fired forced air furnace 15 such that it is protected from physical dangers such as flooded basements, rodents, dirt and the like. The output of the rechargeable battery 90 is then routed through an inverter 95, which operates in a conventional manner to produce 120 VAC from the direct voltage input. This 120 VAC is then applied to the opposite side of the transfer relay 70 to operate the gas-fired forced air furnace 15 in the event of a long term power failure. Additionally, the inefficiencies of conversion from DC to AC are negated for the large electrical load of the variable speed blower 40. The variable speed blower 40 would operate on DC at all times for increased efficiency and better energy utilization. Additionally, the variable speed design will allow for exact matching of the load requirements of the gas-fired forced air furnace 15 such that exact air pressure and flow for heat loss compensation is provided. Thus, no extra energy will be consumed by the variable speed blower 40 when not necessary. It is envisioned that the variable speed capabilities will be incorporated directly into a DC converter as will be described herein below. It should be noted that such teachings are well known in the art and not within the scope of the present invention. Additionally, said features are not a requirement of the present invention and thus should not be interpreted as a limiting factor of the present invention. When operating on conventional AC power, the variable speed blower 40 would be fed via a variable speed drive DC converter. Finally, a controller 105 such as a basic stamp module or microcontroller would be provided to operate and control all electrical devices and ensure proper crossover between operation on conventional utility supplied AC power and that supplied by the apparatus 10. When commercial utility generated AC power returns the controller 105 would switch back for more efficient operation. Due to the electric producing power capability of the thermal power chip 75, it is envisioned that the apparatus 10 could operate continuously for days on end without the use of AC power. It is envisioned that the apparatus 10 would be made available as standard or optional equipment on new gas-fired forced air furnace 15 or could be provided as an add-on kit for aftermarket installation on existing gas-fired forced air furnace 15.

Referring now to FIG. 2, an electrical block diagram depicting the major components of the apparatus 10, according to the preferred embodiment of the present invention, is depicted. Power is generated from a thermal power chip array 110 consisting of a plurality of thermal power chip 75. The exact quantity of thermal power chip 75 would vary per the specific application of the gas-fired forced air furnace 15 (as shown in FIG. 1). A smaller gas-fired forced air furnace 15 (as shown in FIG. 1) used to heat a small home would obviously consist of a smaller number of thermal power chip 75 than of a gas-fired forced air furnace 15 (as shown in FIG. 1) used to heat a large commercial building. The output from the thermal power chip array 110 is routed through the voltage regulator 80, then the charge controller 85 and onto the rechargeable battery 90 where a stable DC bus level is formed. The output is then routed to one side of the transfer relay 70 to feed the variable speed blower 40. The other input to the variable speed blower 40 is provided by the variable speed drive DC converter 100 which is connected to the commercial AC power source 115 through the disconnect switch 65. In a likewise manner, the inverter 95 produces AC power with input from the DC power bus which feeds the other half of the transfer relay 70 to run AC power loads 120 associated with the gas-fired forced air furnace 15 (as shown in FIG. 1) such as burner safety systems, gas control valves, step down transformers, interlock systems, the inducer motor 62, and the like. The opposite side of the other half of the transfer relay 70 is fed directly by the commercial AC power source 115. Control of the relay coil of the transfer relay 70 is controlled by the controller 105.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the moderately skilled user in a simple manner with little training. After initial purchase or acquisition of the apparatus 10, it would be installed as indicated in FIGS. 1 and 2.

The method of utilizing the apparatus 10 may be achieved by performing the following steps: connecting the gas line 20 along with the connection to the intake air 35; connecting the output air 50 along with the flue gas stack 60; connecting the commercial AC power source 115. At this point in time, said apparatus 10 is ready for normal operation.

As long as AC power is available, the apparatus 10 will operate in a normal manner compared to conventional gas-fired forced air furnaces. The user would simply set the desired temperature and mode of operation on the thermostat 73. The controller 105 would select and direct the transfer relay 70 to operate using the commercial AC power source 115. Such a practice would continue until the preset temperature condition was reached. At such time, the apparatus 10 would reset in a continually repeating manner.

Should commercial AC power source 115 be lost, the power thusly generated by the thermal chip array 110 and stored in the rechargeable battery 90 would be used to operate the gas-fired forced air furnace 15. DC power from the rechargeable battery 90 would be used to operate the DC powered variable speed blower 40 through the transfer relay 70, and AC power as generated by the inverter 95 would be used to operate the balance of electrically powered items associated with the electrical-powered back-up apparatus for gas-fired furnaces 10. It is envisioned that such operation would continue indefinitely until the commercial AC power source 115 returns. Such a pattern would repeat in a cyclical fashion as described above. Additionally, it should be noted that the operation of the apparatus 10 would be transparent to the common user as such crossover between operation by the thermal power chip array 110 and the commercial AC power source 115 would be instantaneous and unnoticeable.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A combined gas-fired forced air furnace and electrical backup power source therefore, said combined gas-fired forced air furnace and electrical backup power source comprising:
   a gas-fired forced air furnace having a central burner area emitting heat;
   a gas line adapted to supply a source of fuel to said central burner area;
   a thermal power chip array including a plurality of thermal power chips that produce electric power directly from heat created from said central burner area;
   a quantity of pre-conditioned air;
   an air intake receiving said pre-conditioned air;
   a variable speed blower receiving said pre-conditioned air and thereafter transmitting a pressurized air output;
   a heat exchanger receiving and heating said pressurized air output to a desired temperature level;
   an air output receiving said heated pressurized air output from said heat exchanger and thereafter discharging heated ambient air;
   a flue gas stack routing waste combustion air therethrough;
   an alternating current (AC) power source and a direct current (DC) power converter electrically connected to said AC power source;
   a disconnect switch; and,
   a transfer relay electrically coupled to said disconnect switch;
   wherein said transfer relay routes external electrical power to said variable speed blower when said disconnect switch is closed;
   wherein said transfer relay routes internal electrical power to said variable speed blower when said disconnect switch is open;
   a voltage regulator electrically coupled to said thermal power chip array;
   a charge controller receiving voltage from said voltage regulator;
   a rechargeable battery receiving power from said charge controller;
   a controller electrically coupled to said transfer relay and thereby controlling operation of said transfer relay; and,
   an inverter electrically coupled to said rechargeable battery, said rechargeable battery generating a direct voltage input that is routed through said inverter, said inverter producing a 120-volt AC from said direct voltage input from said rechargeable battery, said 120-volt AC being applied to said transfer relay to operate said gas-fired forced air furnace;
   wherein said thermal power chips produce and direct said voltage to said voltage regulator that conditions and levels an output of said thermal power chips based upon different heat differentials; and,
   wherein said output from said thermal power chips is routed through said voltage regulator and then to said charge controller and then to said rechargeable battery whereat a stable DC bus level is formed.

2. The gas-fired forced air furnace of claim 1, further comprising: a thermostat electrically connected to said controller.

3. The gas-fired forced air furnace of claim 1, wherein said thermal power chips are placed at said heat exchanger and includes thermionic emissions.

4. The gas-fired forced air furnace of claim 1, wherein said variable speed blower operates on DC power.

5. The gas-fired forced air furnace of claim 1, wherein said inverter produces AC power with input from said DC bus level which feeds another half of said transfer relay to run AC power loads associated with said gas-fired forced air furnace.

6. The gas-fired forced air furnace of claim 5, wherein said another half of said other half of said transfer relay is fed directly by said AC power source.

7. A combined gas-fired forced air furnace and electrical backup power source therefore, said combined gas-fired forced air furnace and electrical backup power source comprising:
   a gas-fired forced air furnace having a central burner area emitting heat;
   a gas line adapted to supply a source of fuel to said central burner area;
   a thermal power chip array including a plurality of thermal power chips that produce electric power directly from heat created from said central burner area;
   a quantity of pre-conditioned air;
   an air intake receiving said pre-conditioned air;
   a variable speed blower receiving said pre-conditioned air and thereafter transmitting a pressurized air output;
   a heat exchanger receiving and heating said pressurized air output to a desired temperature level;
   an air output receiving said heated pressurized air output from said heat exchanger and thereafter discharging heated ambient air;
   a flue gas stack routing waste combustion air therethrough;
   an alternating current (AC) power source and a direct current (DC) power converter electrically connected to said AC power source;
   a disconnect switch;
   a transfer relay electrically coupled to said disconnect switch;
   wherein said transfer relay routes external electrical power to said variable speed blower when said disconnect switch is closed;
   wherein said transfer relay routes internal electrical power to said variable speed blower when said disconnect switch is open;
   a voltage regulator electrically coupled to said thermal power chip array;
   a charge controller receiving voltage from said voltage regulator;
   a rechargeable battery receiving power from said charge controller;
   a controller electrically coupled to said transfer relay and thereby controlling operation of said transfer relay; and,
   an inverter electrically coupled to said rechargeable battery, said rechargeable battery generating a direct voltage input that is routed through said inverter, said inverter producing a 120-volt AC from said direct voltage input from said rechargeable battery, said 120-volt AC being applied to said transfer relay to operate said gas-fired forced air furnace;
   wherein said thermal power chips produce and direct said voltage to said voltage regulator that conditions and levels an output of said thermal power chips based upon different heat differentials;
   wherein said output from said thermal power chips is routed through said voltage regulator and then to said charge controller and then to said rechargeable battery whereat a stable DC bus level is formed;
   wherein said DC bus level is routed to said transfer relay which inputs power to said variable speed blower; and, wherein another power input is feed to said variable speed blower by said variable speed DC power converter through said disconnect switch.

8. The gas-fired forced air furnace of claim 7, further comprising: a thermostat electrically connected to said controller.

9. The gas-fired forced air furnace of claim 7, wherein said thermal power chips are placed at said heat exchanger and includes thermionic emissions.

10. The gas-fired forced air furnace of claim 7, wherein said variable speed blower operates on DC power.

11. The gas-fired forced air furnace of claim 7, wherein said inverter produces AC power with input from said DC bus level which feeds another half of said transfer relay to run AC power loads associated with said gas-fired forced air furnace.

12. The gas-fired forced air furnace of claim 11, wherein said another half of said other half of said transfer relay is fed directly by said AC power source.

* * * * *